United States Patent
Tachibana

(10) Patent No.: US 6,515,714 B1
(45) Date of Patent: Feb. 4, 2003

(54) HUE ADJUSTMENT CIRCUIT

(75) Inventor: Masanori Tachibana, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 181 days.

(21) Appl. No.: 09/598,676

(22) Filed: Jun. 21, 2000

(30) Foreign Application Priority Data

Jul. 21, 1999 (JP) .......................................... 11-205969

(51) Int. Cl.$^7$ .............................. H04N 9/64; H04N 9/67
(52) U.S. Cl. ........................ 348/654; 348/649; 348/651; 348/659; 348/653
(58) Field of Search ................................ 348/649, 654, 348/726, 727, 505, 653, 659, 651; 358/520, 296; 382/167–169; 345/690; H04N 9/64

(56) References Cited

U.S. PATENT DOCUMENTS

| | | | | |
|---|---|---|---|---|
| 3,816,846 A | * | 6/1974 | Nero et al. ................. | 348/652 |
| 4,091,411 A | * | 5/1978 | Sanada et al. .............. | 348/605 |
| 4,118,741 A | * | 10/1978 | Gomi et al. ................. | 348/654 |
| 4,197,556 A | * | 4/1980 | Isono et al. ................. | 348/649 |
| 4,207,589 A | * | 6/1980 | Kawasaki .................... | 348/649 |
| 4,679,072 A | * | 7/1987 | Takayama .................... | 358/520 |
| 4,695,875 A | * | 9/1987 | Kishi .......................... | 348/653 |
| 4,788,586 A | * | 11/1988 | Eckenbrecht ............... | 348/649 |
| 5,381,185 A | * | 1/1995 | Ohki et al. .................. | 348/652 |
| 5,654,768 A | * | 8/1997 | Hatano ........................ | 348/640 |

FOREIGN PATENT DOCUMENTS

| | | |
|---|---|---|
| JP | 59-163995 | 9/1984 |
| JP | 1-155795 | 6/1989 |
| JP | 1-288192 | 11/1989 |
| JP | 2-143789 | 6/1990 |

* cited by examiner

Primary Examiner—John Miller
Assistant Examiner—Paulos Natnael
(74) Attorney, Agent, or Firm—Leydig, Voit & Mayer, Ltd.

(57) ABSTRACT

In a hue adjustment circuit for adjustment of a color difference signal by addition, subtraction, and multiplication of hue correction components (sin α, cos α) generated from a sub-carrier signal and a color difference signal (R—Y, B—Y), the hue correction components (sin α, cos α) are derived from a chroma signal processing circuit in a TV set by using a switch to select between the chroma signal and a phase-shifted sub-carrier.

3 Claims, 3 Drawing Sheets

HUE ADJUSTMENT CIRCUIT

FIELD OF THE INVENTION

The present invention relates to a hue adjustment circuit used in TV sets.

BACKGROUND OF THE INVENTION

In NTSC TV sets, a hue adjustment (TINT) circuit is nearly indispensable in order to correct a tint shift caused when demodulating a chroma signal.

On the other hand, devices such as digital video disks (DVDs) have spread in recent years. In order to connect these devices to a TV set, capability of inputting a YUV signal (color difference signal) besides a composite video signal to a TV set is being demanded.

When the YUV signal is input, it is not demodulates and consequently a hue adjustment circuit should be essentially unnecessary. For the purpose of delicate tint adjustment, it is also requested to hue adjust the YUV signal (color difference signal) as well.

The present invention aims at implementing such a hue adjustment on the color difference signal using a compact configuration.

The conventional art will now be described.

FIG. 2 is a diagram showing the conventional art.

In FIG. 2, numeral 1 denotes a 90° phase shift circuit for shifting the phase of a sub-carrier signal (hereafter referred to as fsc signal) by 90°, 2 a TINT phase shift circuit for shifting the phase of the fsc signal in order to adjust the hue, 3a a circuit for multiplying the fsc signal subjected to phase adjustment in the TINT phase shift circuit 2 by the fsc signal subjected to phase shift in the 90° phase shift circuit 1.

In FIGS. 2, 4a, 4b, 4c and 4d are circuits for multiplying output signals of multiplier circuits 3a and 3b by a color difference signal (a R—Y signal and a B—Y signal), and 5a and 5b are circuits for addition and subtraction of outputs of the multiplier circuits 4a, 4b, 4c and 4d.

FIG. 3 is a diagram showing a vector (hue) of a chroma signal.

FIG. 4 is a vector diagram showing phase relations among a burst signal, an original fsc signal FSC(0), a fsc signal FSC(90) subjected to phase shift in the 90° phase shift circuit 1, and a fsc signal subjected to phase adjustment FSC($\alpha$) subjected to phase adjustment in the TINT phase shift circuit 2.

In FIG. 3, it is provisionally assumed that the vector (hue) of a chroma signal of a certain color is A and its angle is $\theta$. The angle of the burst signal is 180°.

When a chroma signal having a hue A is multiplied by the fsc signal and thereby demodulated to the color difference signal (R—Y and B—Y), the R—Y signal and the B—Y signal can be represented as sin $\theta$ and cos $\theta$, respectively.

When the hue A is changed to a hue A' by changing the phase by $\alpha$, the color difference signal R—Y and B—Y demodulated by the fsc signal become sin ($\theta+\alpha$) and cos ($\theta+\alpha$).

From the addition theorem, the following equations (1) and (2) are derived.

$$\sin(\theta+\alpha) = \sin\theta\cos\alpha + \cos\theta\sin\alpha \quad (1)$$

$$\cos(\theta+\alpha) = \cos\theta\cos\alpha - \sin\theta\sin\alpha \quad (2)$$

Therefore, hue adjustment can be conducted by arithmetic operations on the color difference signals R—Y (sin $\theta$) and B—Y (cos $\theta$) and hue correction components sin $\alpha$ and cos $\alpha$.

The hue correction components sin $\alpha$ and cos $\alpha$ can be generated from the fsc signal by using the 90° phase shift circuit 1 and the TINT phase shift circuit 2 as shown in FIG. 2.

Hereafter, its principle will be described.

Typically, demodulation from the chroma signal to the color difference signal (R—Y signal and B—Y signal) is conducted by multiplying two fsc signals, synchronized in phase to the burst signal and differing in phase by 90°, by the chroma signal.

The two fsc signals differing in phase by 90° are obtained from the original fsc signal (hereafter abbreviated to FSC (0)) and a fsc signal (hereafter abbreviated to FSC(90)) shifted in phase by 90° from FSC(0) in the 90° phase shift circuit 1. FIG. 4 shows phase relations among the burst signal, FSC(0), FSC(90).

Here, in the TINT phase shift circuit 2, the phase of FSC(0) is changed by $\alpha$. The output of the TINT phase shift circuit 2 is FSC($\alpha$). FIG. 4 shows phase relations among the burst signal, FSC(0), FSC(90), and FSC($\alpha$).

If FSC(0) is multiplied by FSC ($\alpha$) in the multiplier circuit 3a of FIG. 2, a component cos $\alpha$ a is obtained from its output.

In the same way, if FSC(90) is multiplied by FSC($\alpha$) in the multiplier circuit 3b of FIG. 2, a component sin $\alpha$ is obtained from its output.

Results of these multiplication operations are evident from FIG. 4 as well. Since cos $\alpha$ and sin $\alpha$ are scalar quantities obtained from multiplication of vectors, it is understood that they are direct current signals having neither frequency components not phase components.

As described above, the hue correction components sin $\alpha$ and cos $\alpha$ can be obtained from the fsc signal.

On the other hand, the multiplier circuits 4a and 4b, the adder circuit 5a, and the subtracter circuit 5b are circuits for implementing the equations (1) and (2).

As a result of computation operations conducted in the multiplier circuits 4a and 4b, the adder circuit 5a, and the subtracter circuit 5b, the R—Y signal changed in hue by $\alpha$ (sin ($\theta+\alpha$)) and B—Y signal changed in hue by $\alpha$ (cos ($\theta+\alpha$)) can be obtained.

If the conventional art is used in a TV set, however, a circuit for generating the hue adjustment components sin $\alpha$ and cos $\alpha$ is separately needed. This results in a drawback that the circuit scale becomes large and the system itself becomes complicated.

SUMMARY OF THE INVENTION

It is an object of the present invention to facilitate circuit implementation and make the circuit scale smaller by using the chroma signal demodulation circuit in the TV set as the hue adjustment circuit as well.

Other objects and features of this invention will become apparent from the following description with reference to the accompanying drawings.

DESCRIPTION OF THE PREFERRED EMBODIMENTS

An embodiment of the present invention will now be described by referring to FIG. 1.

Figure 1:
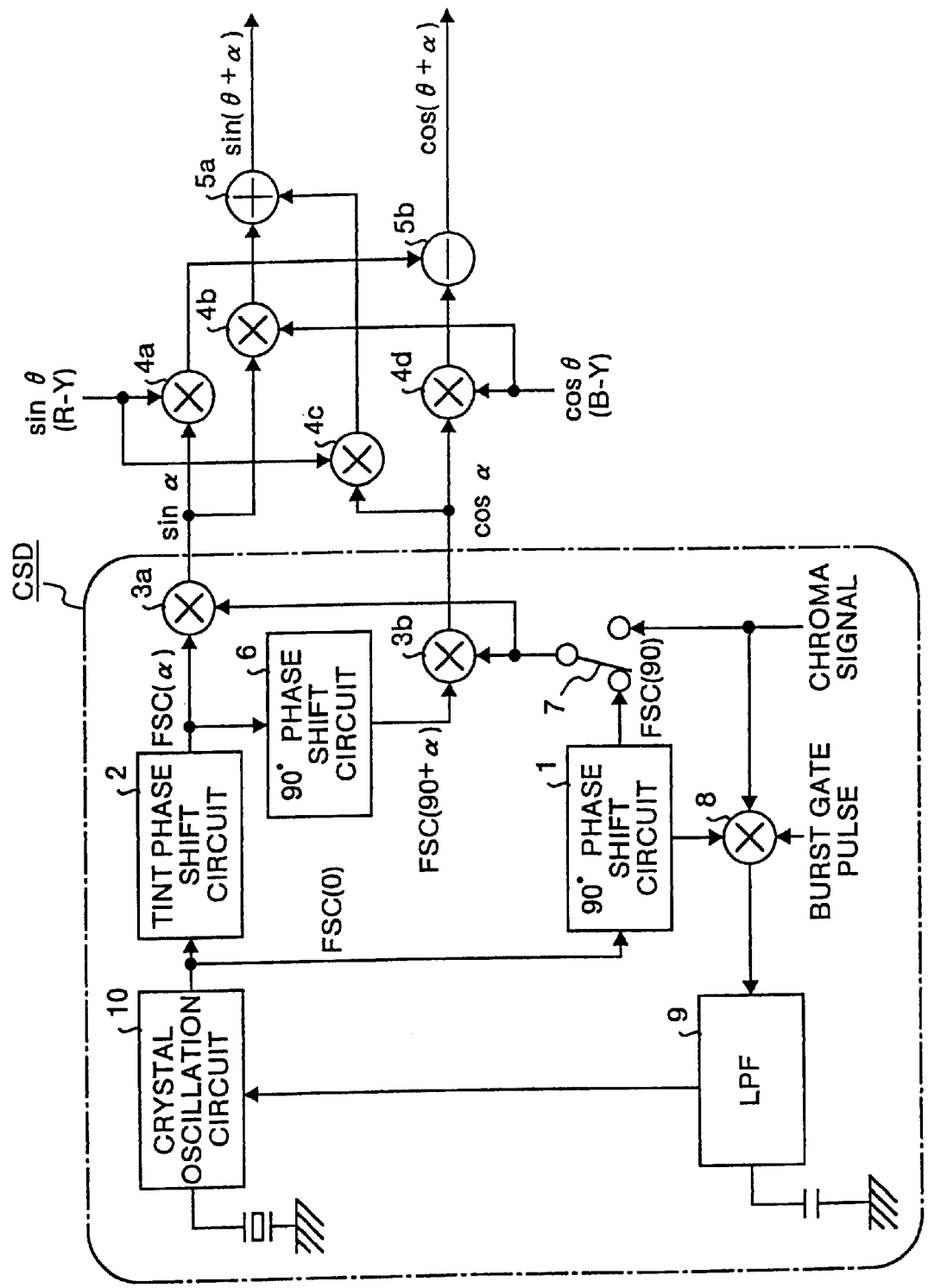
FIG. 1 is a diagram showing a hue adjustment circuit of a color difference signal according to an embodiment of the present invention.
Figure 3:
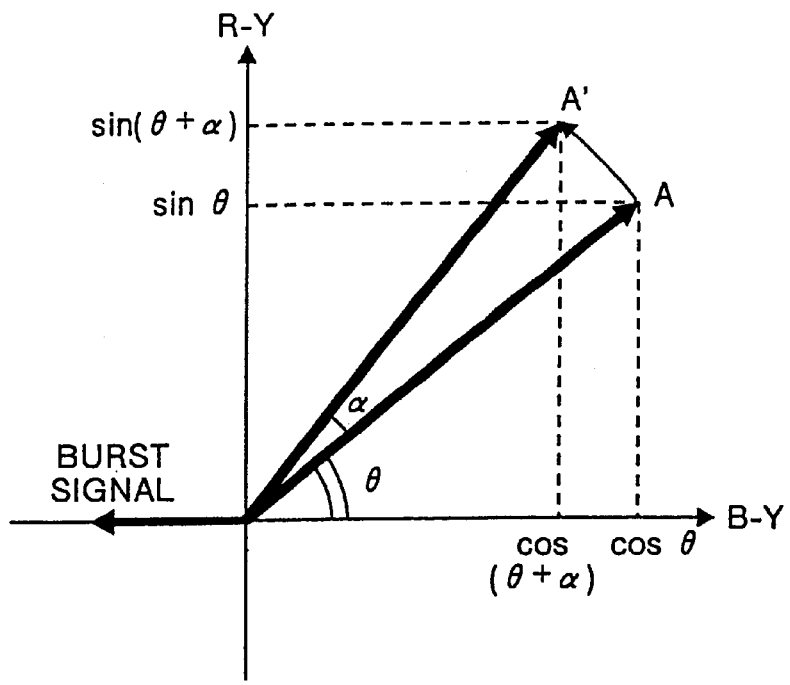
FIG. 3 is a diagram showing a vector (hue) of a chroma signal.
Figure 4:
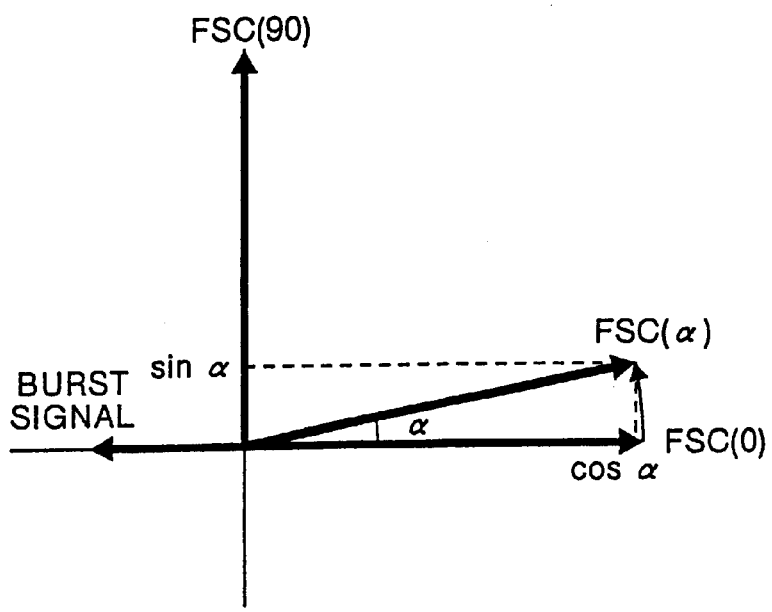
FIG. 4 is a vector diagram showing a phase relation between a burst signal and a fsc signal shifted in phase by a phase shift circuit.

In FIG. 1, numeral 1 denotes a 90° phase shift circuit for shifting the phase of the fsc signal by 90°, and numeral 2 denotes a TINT phase shift circuit for shifting the phase of the fsc signal in order to adjust the hue. In FIG. 1, 3a and 3b denote circuits for multiplying an output signal FSC ($\alpha$) of a TINT phase shift circuit 2 and an output signal FSC(90+$\alpha$) of a 90° phase shift circuit 6 by an output signal FSC(90) of the 90° phase shift circuit 1. Numeral 7 denotes a switch circuit for selecting either the signal FSC(90) or a chroma signal. Numeral 8 denotes a circuit for multiplying the chroma signal by FSC(90) at timing of the burst signal. Numeral 9 denotes a low pass filter for removing high frequency components of an output signal of the multiplier circuit 8. Numeral 10 denotes a crystal oscillation circuit in which the oscillation frequency is controlled using an output voltage of the low pass filter 9.

In FIG. 1, 4a, 4b, 4c and 4d are circuits for multiplying output signals of multiplier circuits 3a and 3b by a color difference signal (a R—Y signal and a B—Y signal), and 5a and 5b are circuits for addition and subtraction of outputs of the multiplier circuits 4a, 4b, 4c and 4d.

In FIG. 1, a section denoted by CSD is a chroma signal demodulation circuit. Except for the switch 7, the CSD has the same configuration as a typical chroma signal demodulation circuit in TV sets.

In a phase lock loop (Pll) formed of the 90° phase shift circuit 1, the multiplier circuit 8, the low pass filter 9, and the crystal oscillation circuit 10, feedback is applied so as to synchronize, in phase, the fsc signal output from the crystal oscillation circuit 10 to the burst of the chroma signal.

Figure 2:
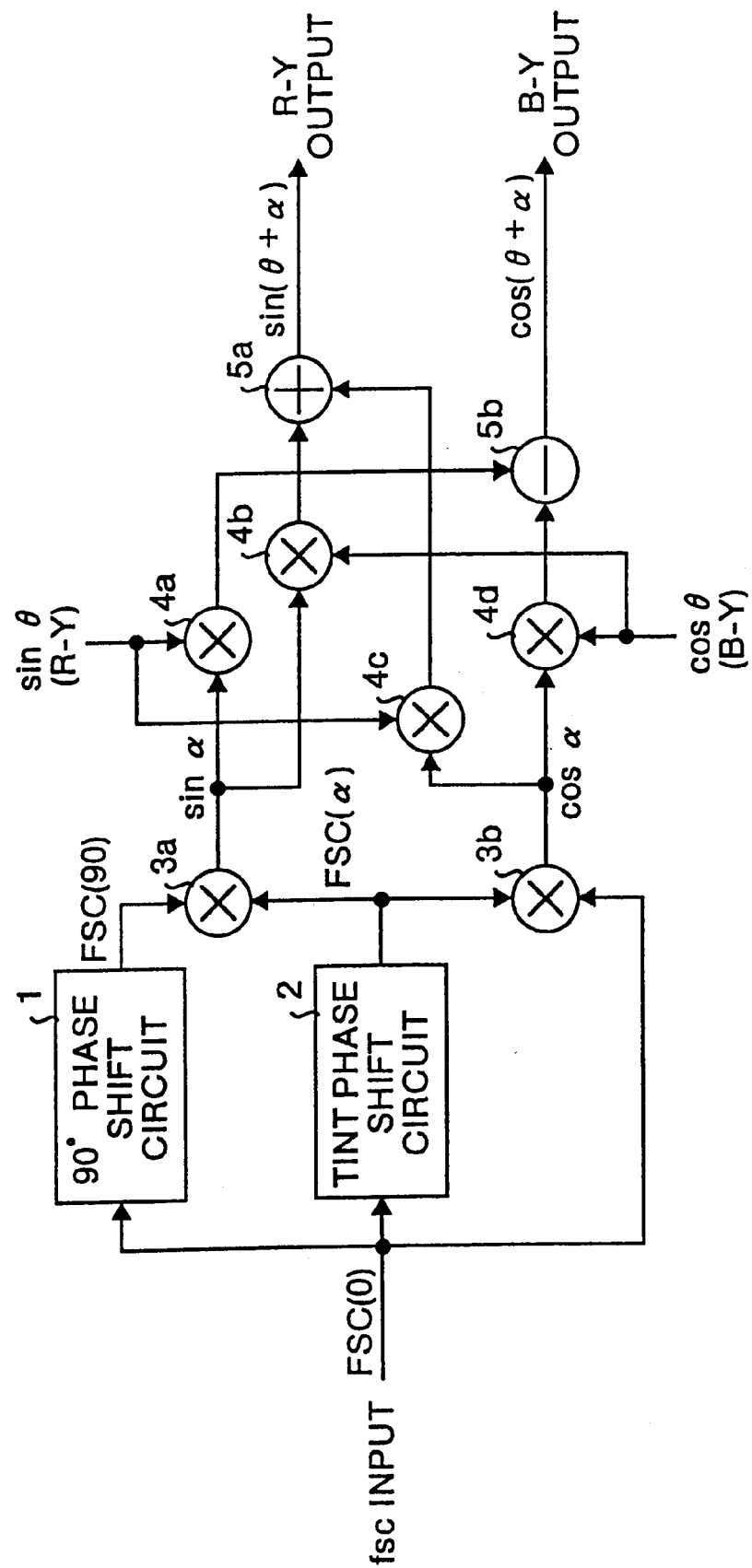
FIG. 2 is a diagram showing a conventional hue adjustment circuit of a color difference signal.

By providing the switch 7, switching selects either the chroma signal or the signal FSC(90). By utilizing the chroma signal demodulation circuit in the TV set, therefore, the hue correction components sin $\alpha$ and cos $\alpha$ can be obtained according to the same principle as the conventional art shown in FIG. 2.

In other words, by multiplying the signal FSC(90) by the signal FSC($\alpha$) in the multiplier circuit 3a, the hue correction component sin $\alpha$ can be obtained. By multiplying the signal FSC(90) by the signal FSC(90+$\alpha$) in the multiplier circuit 3b, the hue correction component cos $\alpha$ can be obtained.

Since the chroma signal demodulation circuit is used as the generation circuit of the hue correction components sin $\alpha$ and cos $\alpha$ as well, the hue adjustment circuit of the color difference signal can be implemented by adding a circuit simpler than the conventional art.

As for multiplying FSC($\alpha$) and FSC(90+$\alpha$) by FSC(90) in the multiplier circuits 3a and 3b, all of them have the same frequency and signals generated from the original fsc signal are multiplied. Advantageously, therefore, phase synchronization among the signals is not necessary. Since the PLL circuit becomes unnecessary, there is obtained an advantage that the circuit configuration does not become complicated.

In the first embodiment of the present invention, a hue adjustment circuit includes: a switch 7 provided in a chroma signal processing circuit (CSD) of a TV set to select either output FSC(90) of a first 90° phase shift circuit 1 for shifting the sub-carrier in phase by 90° or a chroma signal; a first multiplier circuit 3a for multiplying a signal FSC(90) selected by the switch 7 by a signal FSC($\alpha$) supplied from a TINT phase shift circuit 2 in the chroma signal processing circuit CSD of the TV set; and a second multiplier circuit 3b for multiplying the signal FSC(90) selected by the switch 7 by a signal FSC(90+$\alpha$) supplied from a second 90° phase shift circuit 6 for shifting an output of the TINT phase shift circuit 2 by 90°. The hue correction components sin $\alpha$ and cos $\alpha$ are derived from outputs of the first multiplier circuit 3a and the second multiplier circuit 3b. By using the chroma signal demodulation circuit in the TV set as the hue adjustment circuit as well, therefore, there are obtained such effects that the circuit implementation is facilitated and the circuit scale is made smaller.

According to a first aspect of the present invention, in a hue adjustment circuit for implementing hue adjustment of a color difference signal by addition, subtraction, and multiplication of hue correction components generated from a sub-carrier signal and a color difference signal, the hue correction components are derived from a chroma signal processing circuit in a TV set. By using the chroma signal demodulation circuit in the TV set as the hue adjustment circuit as well, therefore, there are obtained such effects that the circuit implementation is facilitated and the circuit scale is made smaller.

According to a second aspect of the present invention, a hue adjustment circuit includes: a switch provided in a chroma signal processing circuit to select either output of a first 90° phase shift circuit for shifting the sub-carrier in phase by 90° or a chroma signal; a first multiplier circuit for multiplying a signal selected by the switch by a signal supplied from a TINT phase shift circuit in the chroma signal processing circuit of the TV set; and a second multiplier circuit for multiplying the signal selected by the switch by a signal supplied from a second 90° phase shift circuit for shifting an output of the TINT phase shift circuit by 90°. The hue correction components are derived from outputs of the first multiplier circuit and the second multiplier circuit. By using the chroma signal demodulation circuit in the TV set as the hue adjustment circuit as well, its TINT phase shift circuit and 90° phase shift circuits are utilized efficiently, Therefore, the circuit implementation is facilitated and the circuit scale is made smaller.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A hue adjustment circuit for implementing hue adjustment of a color difference signal by arithmetic operations on hue correction components obtained from a sub-carrier signal, a color difference signal, and a chroma signal in a television set, the hue adjustment circuit comprising:

a switch included in a chroma signal processing circuit for selecting (i) output of a first 90° phase shift circuit shifting the sub-carrier in phase by 90° and (ii) a chroma signal;

a first multiplier circuit for multiplying a signal selected by said switch by a signal supplied from a TINT phase shift circuit in the chroma signal processing circuit of the television set; and a second multiplier circuit for multiplying the signal selected by said switch by a signal supplied from a second 90° phase shift circuit shifting an output of said TINT phase shift circuit by 90°, wherein the hue correction components are derived from outputs of said first multiplier circuit and said second multiplier circuit.

2. A hue adjustment circuit for a television receiver for adjusting a color difference signal based on a sub-carrier signal and a chroma signal, the hue adjustment circuit comprising:

a tint phase shift circuit producing a tint signal;

a first 90° phase shift circuit receiving the sub-carrier and producing a first phase shifted signal;

a second 90° phase shift circuit receiving the tint signal and producing a second phase shifted signal;

a switch selectively connected to and providing as an output the chroma signal and the first phase shifted signal;

a first multiplier receiving the tint signal and the output provided by the switch to produce a first hue correction component signal; and a second multiplier receiving the second phase shift signal and the output provided by the switch to produce a second hue component correction signal.

3. The hue adjustment circuit of claim 2 including a third multiplier receiving the chroma signal and a burst gate pulse to produce a phase control signal;

a filter receiving the phase control signal and producing a filtered signal; and a voltage controlled oscillator receiving the filtered signal and oscillating to produce the sub-carrier signal.

* * * * *